US010356487B2

(12) United States Patent
Xiong

(10) Patent No.: US 10,356,487 B2
(45) Date of Patent: Jul. 16, 2019

(54) VIDEO ADVERTISEMENT FILTERING METHOD, APPARATUS AND DEVICE

(71) Applicant: Baidu Online Network Technology (Beijing) Co., Ltd., Beijing (CN)

(72) Inventor: Zefa Xiong, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 11 days.

(21) Appl. No.: 15/115,584

(22) PCT Filed: Dec. 18, 2014

(86) PCT No.: PCT/CN2014/094249
§ 371 (c)(1),
(2) Date: Jul. 29, 2016

(87) PCT Pub. No.: WO2016/037441
PCT Pub. Date: Mar. 17, 2016

(65) Prior Publication Data
US 2018/0176658 A1 Jun. 21, 2018

(30) Foreign Application Priority Data
Sep. 9, 2014 (CN) .......................... 2014 1 0455677

(51) Int. Cl.
*H04N 21/81* (2011.01)
*H04N 21/234* (2011.01)
(Continued)

(52) U.S. Cl.
CPC ..... *H04N 21/812* (2013.01); *H04N 21/23424* (2013.01); *H04N 21/454* (2013.01); *H04N 21/8456* (2013.01)

(58) Field of Classification Search
None
See application file for complete search history.

(56) References Cited

U.S. PATENT DOCUMENTS

2003/0221191 A1 11/2003 Khusheim
2006/0085812 A1 4/2006 Shishegar et al.
(Continued)

FOREIGN PATENT DOCUMENTS

CN 102209213 A 10/2011
CN 103561327 2/2014
(Continued)

OTHER PUBLICATIONS

International Search Report in PCT/CN2014/094249 dated Jun. 12, 2015 in 5 pages.
(Continued)

*Primary Examiner* — James R Marandi
(74) *Attorney, Agent, or Firm* — Knobbe Martens Olson & Bear LLP

(57) ABSTRACT

Disclosed in embodiments of the present invention are a video advertisement filtering method, apparatus and device. The video advertisement filtering method includes: recognizing a time count number in a time count area of an advertisement frame in a video; determining a time difference between advertisement broadcast end time and present time based on the recognized time count number; and advancing playing time of the video to the advertisement broadcast end time based on the time difference. The video advertisement filtering method, apparatus and device that are provided in the embodiments of the present invention can filter an inserted video advertisement from a video program.

12 Claims, 5 Drawing Sheets

(51) Int. Cl.
*H04N 21/454* (2011.01)
*H04N 21/845* (2011.01)

(56) References Cited

U.S. PATENT DOCUMENTS

| | | |
|---|---|---|
| 2011/0235993 A1 | 9/2011 | Zeng |
| 2011/0243533 A1* | 10/2011 | Stern ................. H04N 21/2541 386/278 |
| 2012/0005702 A1 | 1/2012 | Tindell |
| 2012/0237182 A1* | 9/2012 | Eyer ...................... H04N 5/783 386/241 |
| 2013/0014140 A1 | 1/2013 | Ye et al. |
| 2014/0351851 A1 | 11/2014 | Stern et al. |
| 2015/0242104 A1* | 8/2015 | Stokman ............. G06F 3/04845 715/723 |
| 2015/0326814 A1* | 11/2015 | Stephens ................ H04N 5/445 725/32 |

FOREIGN PATENT DOCUMENTS

| | | |
|---|---|---|
| CN | 103686249 | 3/2014 |
| CN | 103957427 A | 7/2014 |
| CN | 104202668 A | 12/2014 |
| JP | 2006270299 A | 10/2006 |
| WO | WO 2008/107424 | 9/2008 |
| WO | 2010115941 A1 | 10/2010 |

OTHER PUBLICATIONS

Office Action in European application No. 14901482.1, dated Mar. 1, 2019, in 5 pages.

* cited by examiner

VIDEO ADVERTISEMENT FILTERING METHOD, APPARATUS AND DEVICE

CROSS REFERENCE TO RELATED APPLICATIONS

This application is the U.S. National Phase Application under 35 U.S.C. § 371 of International Application No. PCT/CN2014/094249, filed Dec. 18, 2014, designating the U.S. and published as WO 2016/037441 A1 on Mar. 17, 2016, which claims the benefit of Chinese Patent Application No. 201410455677.4, filed Sep. 9, 2014, which are hereby incorporated by reference in their entirety.

TECHNICAL FIELD

Embodiments of the present invention relate to the technical field of network communications, and in particular, to a video advertisement filtering method, apparatus and device.

BACKGROUND

Since the dawn of the new century, as Internet technologies keep evolving, people are no more content with online textual and pictorial information acquisition, and desire to watch more concurrent and attractive video programs using the Internet platform. Accordingly, video websites have emerged and developed rapidly in recent years. Here, a video website refers to a website that produces, integrates, and broadcasts audio/video programs or provides audio/video uploading and sharing services to the Internet users.

Advertisements are an essential part in the operation of the video websites. When watching a video program through a video website, a user generally hopes to skip an advertisement inserted in the video program. However, existing browsers do not have a corresponding technical means.

SUMMARY

In view of this background, embodiments of the present invention propose a video advertisement filtering method, apparatus and device, to filter out an advertisement inserted in a video program.

According to a first aspect, an embodiment of the present invention provides a method for filtering a video advertisement, including:
  recognizing a time count number in a time count area of an advertisement frame in a video;
  determining a time difference between advertisement broadcast end time and present time based on the recognized time count number; and
  advancing playing time of the video to the advertisement broadcast end time based on the time difference.

According to a second aspect, an embodiment of the present invention provides an apparatus for filtering a video advertisement, including:
  a time count number recognition module, configured to recognize a time count number in a time count area of an advertisement frame in a video;
  a time difference determination module, configured to determine a time difference between advertisement broadcast end time and present time based on the recognized time count number; and
  a time advance module, configured to advance playing time of the video to the advertisement broadcast end time based on the time difference.

According to a third aspect, an embodiment of the present invention provides a device for executing a method for filtering a video advertisement, comprising at least one processor, a memory, and at least one computer program, the at least one computer program being stored in the memory and being executed by the at least one processor, wherein the computer program comprises instructions for performing the following operations:
  recognizing a time count number in a time count area of an advertisement frame in a video;
  determining a time difference between advertisement broadcast end time and present time based on the recognized time count number; and
  advancing playing time of the video to the advertisement broadcast end time based on the time difference.

The method and apparatus for filtering a video advertisement provided in the embodiments of the present invention recognize a time count number in a time count area of an advertisement frame in a video, determine a time difference between advertisement broadcast end time and present time based on the recognized time count number, and advance playing time of the video to the advertisement broadcast end time based on the time difference between advertisement broadcast end time and present time, so as to filter out an advertisement inserted in a video program.

BRIEF DESCRIPTION OF THE DRAWINGS

Other features, objectives, and advantages of the present invention will become clear with reference to the following detailed description of non-limitative embodiments and the accompanying drawings, in which.

DETAILED DESCRIPTION

Hereinafter, the present invention is further described in detail with reference to the accompanying drawings and the embodiments. It may be understood that the specific embodiments described herein are merely used to explain the present invention, but not used to limit the present invention. It should be noted that only the components related to the present invention, instead of all components, are shown in the accompanying drawings, for ease of description.

First embodiment

Figure 1:
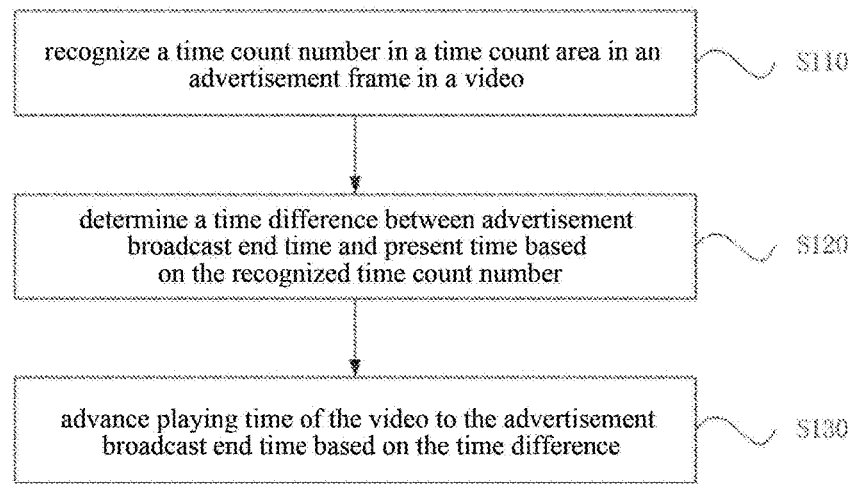
FIG. 1 is a flowchart showing a method for filtering a video advertisement according to the first embodiment of the present invention.

FIG. 1 is a flowchart showing a method for filtering a video advertisement according to the first embodiment of the present invention. The method for filtering a video advertisement is implemented in an apparatus for filtering a video advertisement. The apparatus for filtering a video advertisement is integrated into a client terminal connected to the Internet, and the client terminal can access video programs on the Internet by using a browser or another client program. Referring to FIG. 1, the method for filtering a video advertisement includes:

S110, to recognize a time count number in a time count area of an advertisement frame in a video.

The frame refers to a video advertisement frame received by an apparatus for filtering a video advertisement during browsing of a video website, and is a part of frames of an entire video. Rough estimation may be performed first, to determine the video advertisement frame in the frames of the entire video. For example, it may be considered that a normal movie video will have an advertisement inserted at its beginning, and an initial frame of the video frames is a video advertisement frame.

Figure 2:
FIG. 2 is a screen capture of a video advertisement according to the first embodiment of the present invention.

FIG. 2 is a screen capture of a video advertisement according to the first embodiment of the present invention. Referring to FIG. 2, the video advertisement frame includes a time count area 201. A time count number 202 is provided in the time count area 201. The time count number 202 is used to count a time period from video advertisement broadcast end time.

The apparatus for filtering a video advertisement may recognize a time count area in a video advertisement, and then perform text recognition, in order to recognize a time count number from a time count area of an advertisement frame in a video. Preferably, the apparatus for filtering a video advertisement may recognize the time count number from the time count area of the advertisement frame in the video by using a text recognition algorithm.

S120, to determine a time difference between advertisement broadcast end time and present time based on the recognized time count number.

After obtaining the recognition result of the time count number from the video advertisement frame by using a text recognition algorithm, the apparatus for filtering a video advertisement may determine the time difference between the advertisement broadcast end time and the present time based on the recognized time count number.

S130, to advance playing time of the video to the advertisement broadcast end time based on the time difference.

After obtaining the recognition result of the time count number from the video advertisement frame by using a text recognition algorithm, the apparatus for filtering a video advertisement advances the playing time of the video to the advertisement broadcast end time.

In this embodiment, the time count number in the time count area of the advertisement frame in the video is recognized, a time difference between the advertisement broadcast end time and the present time is determined based on the recognized time count number, and the playing time of the video is advanced to the advertisement broadcast end time based on the time difference, so that the client terminal can filter out the advertisement inserted in the video program.

Second embodiment

The method for filtering a video advertisement provided in this embodiment is based on the first embodiment of the present invention. Furthermore, the determining of a time difference between the advertisement broadcast end time and the present time based on the recognized time count number includes:

S121, to use the recognized time count number in the time count area at the present time as the time difference between the advertisement broadcast end time and the present time.

For the time count number in the time count area, a countdown manner is usually used to count the playing time of a video advertisement. Moreover, since the computing speeds of computers have now generally been improved, the elapsed time to recognize the time count number may be ignored. Therefore, the recognized time count number in the time count area at the present time may be used as the time difference between the advertisement broadcast end time and the present time.

In this embodiment, the recognized time count number in the time count area at the present time is used as the time difference between the advertisement broadcast end time and the present time, so that the apparatus for filtering a video advertisement can determine the time difference between the advertisement broadcast end time and the present time based on the recognized time count number, thereby filtering the video advertisement.

Third embodiment

Figure 3:
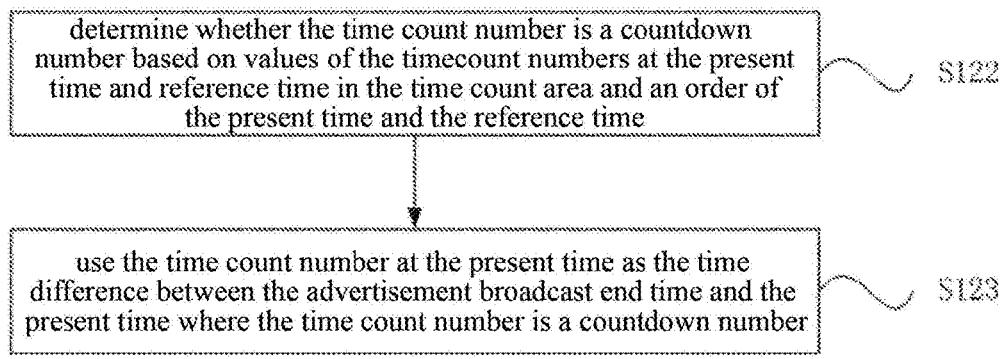
FIG. 3 is a flowchart of determining a time difference in a method for filtering a video advertisement according to the third embodiment of the present invention.

FIG. 3 is a flowchart of determining a time difference in a method for filtering a video advertisement according to the third embodiment of the present invention. The method for filtering a video advertisement is based on the first embodiment of the present invention. Furthermore, the determining of a time difference between the advertisement broadcast end time and the present time based on the recognized time count number includes: determining whether the time count number is a countdown number based on values of the time count numbers at the present time and reference time in the time count area and an order of the present time and the reference time; and using the time count number at the present time as the time difference between the advertisement broadcast end time and the present time where the time count number is a countdown number.

Referring to FIG. 3, the determining of a time difference between the advertisement broadcast end time and the present time based on the recognized time count number includes:

S122, to determine whether the time count number is a countdown number based on values of the time count numbers at the present time and the reference time in the time count area and an order of the present time and the reference time.

Although most of time count numbers in video advertisement frames are countdown numbers, there are still count-up numbers in some video advertisement frames. To ensure that the time count number is a countdown number, a reference time is chosen from the timeline of playing the advertisement video, and it is determined whether the time count number is a countdown number based on values of the time count numbers at the present time and reference time in the time count area and an order of the present time and the reference time.

For example, in the event that the reference time is after the present time, the time count number is a countdown number if the time count number at the reference time is less than the time count number at the present time, and the time count number is a count-up number if the time count number at the reference time is larger than the time count number at the present time.

When choosing the reference time, it should be kept in mind that a time interval between the reference time and the present time is not too short. If the time interval between the reference time and the present time is less than one second, the time count number may stay the same at the reference time and at the present time, resulting in a difficulty of determining the counting mode of the time count number.

S123, to use the time count number at the present time as the time difference between the advertisement broadcast end time and the present time where the time count number is a countdown number.

After the determination whether the time count number is a countdown number, the time count number at the present time is used as the time difference between the advertisement broadcast end time and the present time, if the time count number is a countdown number.

In this embodiment, a reference time is chosen before a time difference between the advertisement broadcast end time and the present time is determined, and it is determined whether the time count number is a countdown number based on values of the time count numbers at the reference time and the present time, in order to determine more accurately the time interval that should be skipped for filtering the advertisement, thereby improving the accuracy of filtering a video advertisement.

Fourth embodiment

Figure 4:
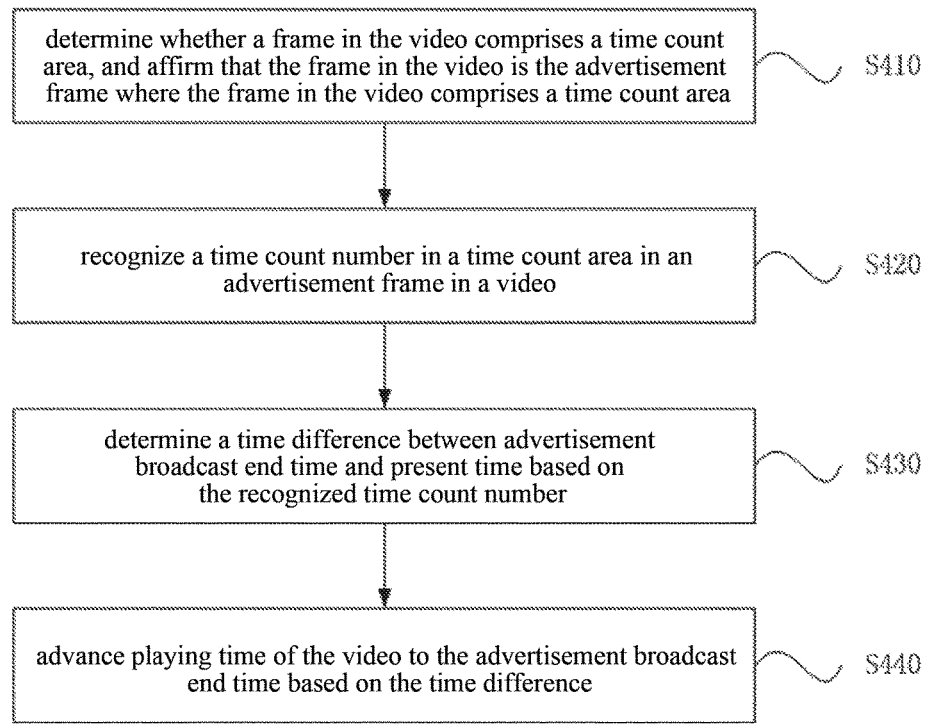
FIG. 4 is a flowchart showing the method for filtering a video advertisement according to the fourth embodiment of the present invention.

FIG. 4 is a flowchart showing the method for filtering a video advertisement according to the fourth embodiment of the present invention. The method for filtering a video advertisement is based on the first embodiment of the present invention. Furthermore, before the time count number in the time count area of the advertisement frame in the video is recognized, the method further includes: determining whether a frame in the video includes a time count area, and affirming that the frame in the video is the advertisement frame where the frame in the video includes a time count area.

Referring to FIG. 4, the method for filtering a video advertisement includes:

S410, to determining whether a frame in the video includes a time count area, and affirming that the frame in the video is the advertisement frame where the frame in the video includes a time count area.

A video advertisement may be inserted at the beginning or the end of a video program or inserted in the middle of the video program. Therefore, the apparatus for filtering a video advertisement needs to determine whether the video being played is a video advertisement, before filtering a video advertisement.

An apparent difference between a frame of a video advertisement and that of a video program is that a time count area is embedded in the frame of the video advertisement during the playing of the video advertisement, whereas there is no time count area embedded in the frame of the video during the playing of the video program. Therefore, it may be determined whether a frame in the video is a video advertisement frame by determining whether the frame in the video includes a time count area.

Preferably, it may be determined whether the frame of the video includes a time count area by using a video frame recognition algorithm.

S420, to recognize a time count number in a time count area of an advertisement frame in a video.

S430, to determine a time difference between advertisement broadcast end time and present time based on the recognized time count number.

S440, to advance playing time of the video to the advertisement broadcast end time based on the time difference.

In this embodiment, before the recognition of the time count number in the time count area of the advertisement frame in a video, it is determined whether a frame in the video includes a time count area to confirm that the frame in the video is the advertisement frame, so that it can be synchronously determined whether an video advertisement in the video is started to be played while the video is played, thereby improving the timeliness of filtering an video advertisement.

Fifth embodiment

Figure 5:
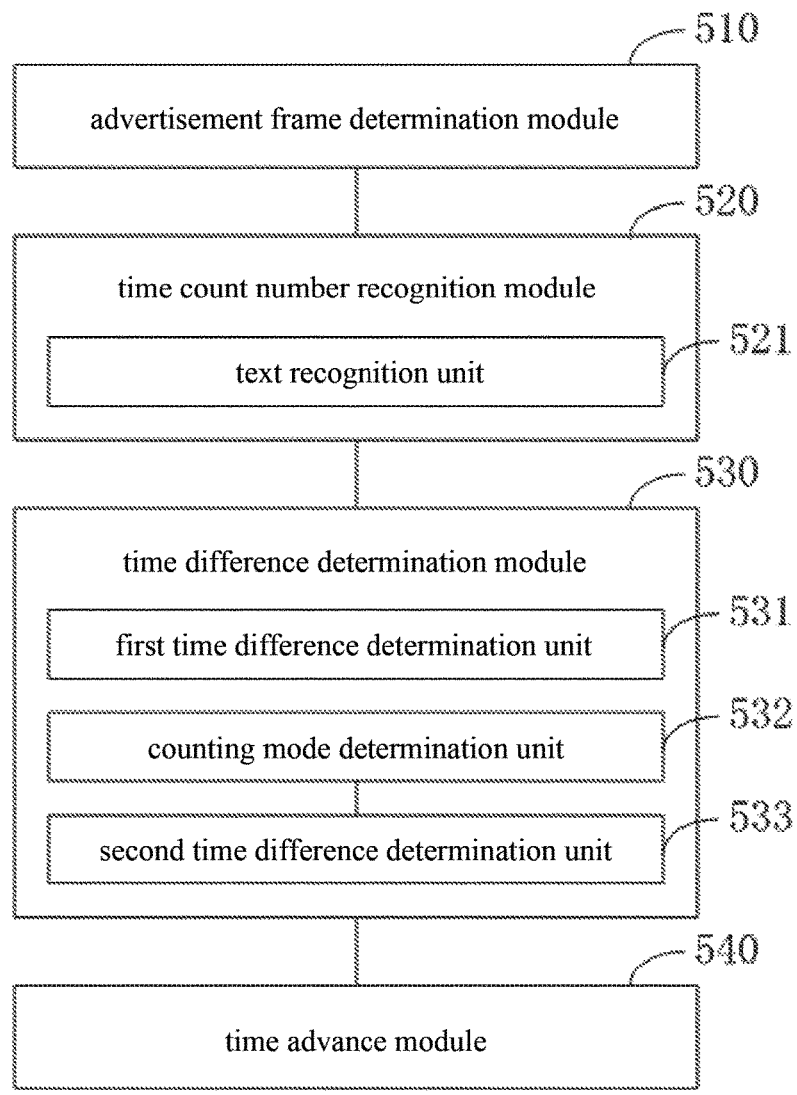
FIG. 5 is a diagram showing the structure of an apparatus for filtering a video advertisement according to the fifth embodiment of the present invention.

FIG. 5 is a diagram showing the structure of an apparatus for filtering a video advertisement according to the fifth embodiment of the present invention. Referring to FIG. 5, the apparatus for filtering a video advertisement includes a time count number recognition module 520, a time difference determination module 530, and a time advance module 540.

The time count number recognition module 520 is configured to recognize a time count number in a time count area of an advertisement frame in a video.

The time difference determination module 530 is configured to determine a time difference between advertisement broadcast end time and present time based on the recognized time count number.

The time advance module 540 is configured to advance playing time of the video to the advertisement broadcast end time based on the time difference.

Preferably, the time difference determination module 530 includes a first time difference determination unit 531.

The first time difference determination unit 531 is configured to use the recognized time count number in the time count area at the present time as the time difference between the advertisement broadcast end time and the present time.

Preferably, the time difference determination module 530 includes a counting mode determination unit 532 and a second time difference determination unit 533.

The counting mode determination unit 532 is configured to determine whether the time count number is a countdown number based on values of the time count numbers at the present time and reference time in the time count area and an order of the present time and the reference time.

The second time difference determination unit 533 is configured to use the time count number at the present time as the time difference between the advertisement broadcast end time and the present time where the time count number is a countdown number.

Preferably, the apparatus for filtering a video advertisement further includes an advertisement frame determination module 510.

The advertisement frame determination module 510 is configured to determine whether a frame in the video includes a time count area and to affirm that the frame in the video is the advertisement frame where the frame in the video includes a time count area, before the time count number in the time count area of the advertisement frame in the video is recognized.

Preferably, the time count number recognition module 520 includes a text recognition unit 521.

The text recognition unit 521 is configured to use a text recognition algorithm to recognize the time count number from the time count area of the advertisement frame in the video.

Sixth embodiment

This embodiment provides a non-volatile computer storage medium which stores one or more modules. When the one or more modules are executed by a server for performing a method for filtering a video advertisement, the server is enabled to perform the following operations:

recognizing a time count number in a time count area of an advertisement frame in a video;

determining a time difference between advertisement broadcast end time and present time based on the recognized time count number; and advancing playing time of the video to the advertisement broadcast end time based on the time difference.

When the one or more modules stored in the storage medium are executed by the server, the determining a time difference between the advertisement broadcast end time and the present time based on the recognized time count number includes:

using the recognized time count number in the time count area at the present time as the time difference between the advertisement broadcast end time and the present time.

When the one or more modules stored in the storage medium are executed by the server, the determining a time difference between the advertisement broadcast end time and the present time based on the recognized time count number includes:

determining whether the time count number is a countdown number based on values of the time count numbers at the present time and reference time in the time count area and an order of the present time and the reference time; and using the time count number at the present time as the time difference between the advertisement broadcast end time and the present time where the time count number is a countdown number.

When the one or more modules stored in the storage medium are executed by the server, the determining a time difference between the advertisement broadcast end time and the present time based on the recognized time count number includes:

determining whether the time count number is a countdown number based on values of the time count numbers at the present time and reference time in the time count area and an order of the present time and the reference time; and using the time count number at the present time as the time difference between the advertisement broadcast end time and the present time where the time count number is a countdown number.

When the one or more modules stored in the storage medium are executed by the server, the operations further include, before the recognizing a time count number in a time count area of an advertisement frame in a video:

determining whether a frame in the video includes a time count area, and affirming that the frame in the video is the advertisement frame where the frame in the video includes a time count area.

When the one or more modules stored in the storage medium are executed by the server, the recognizing a time count number in a time count area of an advertisement frame in a video includes:

recognizing the time count number in the time count area of the advertisement frame in the video by using a text recognition algorithm.

Seventh embodiment

Figure 6:
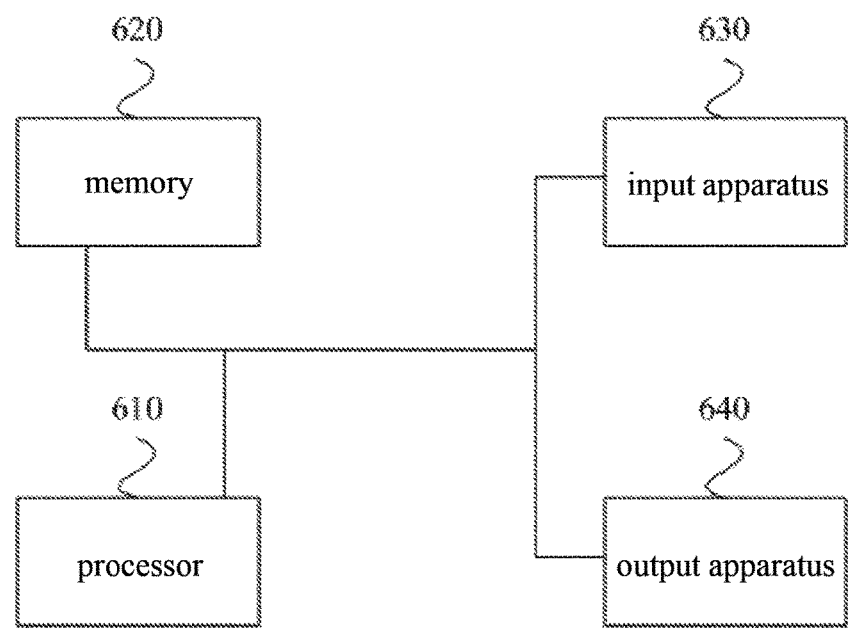
FIG. 6 is a diagram showing the hardware structure of a device for executing a method for filtering a video advertisement according to the seventh embodiment of the present invention.

FIG. 6 is a diagram showing the hardware structure of a device for executing a method for filtering a video advertisement according to the seventh embodiment of the present invention. Referring to FIG. 6, a diagram of the hardware structure of a device for executing a method for filtering a video advertisement according to the eighth embodiment of the present invention is shown. The device includes:

one or more processors 610, where in FIG. 6, one processor 610 is shown as an example;

a memory 620; and one or more modules.

The server may further include: an input apparatus 630 and an output apparatus 640. The processor 610, the memory 620, the input apparatus 630, and the output apparatus 640 in the server may be connected via a bus or in another manner. In FIG. 6, a bus for connection is used as an example.

The memory 620 as a computer readable storage medium may be configured to store a software program, a computer executable program, and a module, for example, a program instruction/module (for example, the advertisement frame determination module 510 and the time count number recognition module 520 in the apparatus for filtering a video advertisement shown in FIG. 5) corresponding to a method for presenting traffic information in the embodiments of the present invention. The processor 610 may run the software program, instruction, or module stored in the memory 620 to execute various functional applications and data processing of the server, so that the method for presenting traffic information in the foregoing method embodiment is implemented.

The memory 620 may include a program storage area and a data storage area, in which the program storage area may store an operating system and an application program required for at least one function, and the data storage area may store data and the like that is created for the use of a terminal device. In addition, the memory 620 may include a high-speed random access memory, and may further include a non-volatile memory, for example, at least one disk storage device, a flash memory device, or another non-volatile solid-state storage device. In some examples, the memory 620 may further include memories disposed remotely from the processor 610. These remote memories may be connected to a terminal device via a network. An example of the network includes, but is not limited to, the Internet, an intranet, a local area network, a mobile communication network, and a combination thereof.

The input apparatus 630 may be configured to receive input numbers or character information, and generate key signal inputs related to the user settings and function control of a terminal. The output apparatus 640 may include a display device such as a display screen.

The one or more modules are stored in the memory 620, and perform, when being executed by the one or more processors 610, the following operations:

recognizing a time count number in a time count area of an advertisement frame in a video;

determining a time difference between advertisement broadcast end time and present time based on the recognized time count number; and advancing playing time of the video to the advertisement broadcast end time based on the time difference.

Furthermore, the determining a time difference between the advertisement broadcast end time and the present time based on the recognized time count number includes:

using the recognized time count number in the time count area at the present time as the time difference between the advertisement broadcast end time and the present time.

Furthermore, the determining a time difference between the advertisement broadcast end time and the present time based on the recognized time count number includes:

determining whether the time count number is a countdown number based on values of the time count numbers at the present time and reference time in the time count area and an order of the present time and the reference time; and using the time count number at the present time as the time difference between the advertisement broadcast end time and the present time where the time count number is a countdown number.

Furthermore, before the recognizing a time count number in a time count area of an advertisement frame in a video, the operations further include:

determining whether a frame in the video includes a time count area, and affirming that the frame in the video is the advertisement frame where the frame in the video includes a time count area.

Furthermore, the recognizing a time count number in a time count area of an advertisement frame in a video includes:

recognizing the time count number in the time count area of the advertisement frame in the video by using a text recognition algorithm.

The order of describing the above embodiments of the present invention are merely used for description and do not reflect the preferences of the embodiments.

A person having ordinary skills in the art should understand that the modules or steps of the present invention as described above can be implemented by using a general purpose computing device. The modules and steps can be integrated into a single computing device or distributed over a network including a plurality of computing devices. Optionally, the modules and steps can be implemented by computing device executable program code, so that the modules and steps can be stored in a storage apparatus and executed by the computing device, alternatively, they can be implemented in various integrated circuit modules, or multiple modules or steps are implemented in a single integrated circuit module for implementation. Accordingly, the present invention is not limited to any combination of specific hardware and software.

Various embodiments of the present disclosure are described herein in sequence. Emphasis is on the difference between each embodiment and the remaining embodiments. For the same or similar parts among respective embodiments, reference may be made to other embodiments.

The above description is merely preferred embodiments of the present invention, and not intended to limit the present invention. A person skilled in the art can make various changes and variations to the embodiments. Any modifications, equivalent replacements, and improvements made without departing from the spirit and principle of the present invention shall fall within the protection scope of the present invention.

What is claimed is:

1. A method for filtering a video advertisement, comprising:
    determining, by using a video frame recognition algorithm, whether a presently displayed frame in a video comprising a time count area displayed along with the frame, and affirming the presently displayed frame in the video being an advertisement frame in response to the presently displayed frame in the video comprising the time count area displayed along with the frame;
    identifying a time count number in the time count area displayed along with the presently displayed advertisement frame in the video;
    determining a time difference between an advertisement broadcast end time and a present time based on the identified time count number; and
    automatically advancing playing time of the video to the advertisement broadcast end time based on the time difference.

2. The method of claim 1, wherein determining the time difference between the advertisement broadcast end time and the present time based on the identified time count number comprises:
    using the identified time count number in the time count area at the present time as the time difference between the advertisement broadcast end time and the present time.

3. The method of claim 1, wherein determining the time difference between the advertisement broadcast end time and the present time based on the identified time count number comprises:
    determining whether the time count number is a countdown number based on values of the time count numbers at the present time and a reference time in the time count area and an order of the present time and the reference time; and
    using the time count number at the present time as the time difference between the advertisement broadcast end time and the present time where the time count number is a countdown number.

4. The method of claim 1, wherein identifying the time count number in the time count area displayed along with the presently displayed advertisement frame in the video comprises:
    identifying the time count number in the time count area displayed along with the presently displayed advertisement frame in the video by using a text recognition algorithm.

5. A video advertisement filtering device comprising at least one processor, a memory, and at least one computer program, the at least one computer program being stored in the memory and configured to be executed by the at least one processor, wherein the computer program comprises instructions for causing the at least one processor to perform:
    determining, by using a video frame recognition algorithm, whether a presently displayed frame in a video comprising a time count area displayed along with the frame, and affirming the presently displayed frame in the video being an advertisement frame in response to the frame in the video comprising the time count area displayed along with the frame;
    identifying a time count number in the time count area displayed along with the presently displayed advertisement frame in the video;
    determining a time difference between an advertisement broadcast end time and a present time based on the identified time count number; and
    automatically advancing playing time of the video to the advertisement broadcast end time based on the time difference.

6. The device of claim 5, wherein determining the time difference between the advertisement broadcast end time and the present time based on the identified time count number comprises:
    using the identified time count number in the time count area at the present time as the time difference between the advertisement broadcast end time and the present time.

7. The device of claim 5, wherein determining the time difference between the advertisement broadcast end time and the present time based on the identified time count number comprises:
    determining whether the time count number is a countdown number based on values of the time count numbers at the present time and a reference time in the time count area and an order of the present time and the reference time; and using the time count number at the present time as the time difference between the advertisement broadcast end time and the present time where the time count number is a countdown number.

8. The device of claim 5, wherein identifying the time count number in the time count area displayed along with the presently displayed advertisement frame in the video comprises:

identifying the time count number in the time count area displayed along with the currently displayed advertisement frame in the video by using a text recognition algorithm.

9. A non-transitory computer storage medium storing computer program comprising instructions, which, when executed by one or more computers, cause the one or more computers to perform:

determining, by using a video frame recognition algorithm, whether a presently displayed frame in a video comprising a time count area displayed along with the frame, and affirming the presently displayed frame in the video being an advertisement frame in response to the presently displayed frame in the video comprising the time count area displayed along with the frame;

identifying a time count number in the time count area displayed along with the presently displayed advertisement frame in the video;

determining a time difference between an advertisement broadcast end time and a present time based on the identified time count number; and automatically advancing playing time of the video to the advertisement broadcast end time based on the time difference.

10. The non-transitory computer storage medium of claim 9, wherein determining the time difference between the advertisement broadcast end time and the present time based on the identified time count number comprises:

using the identified time count number in the time count area at the present time as the time difference between the advertisement broadcast end time and the present time.

11. The non-transitory computer storage medium of claim 9, wherein determining the time difference between the advertisement broadcast end time and the present time based on the identified time count number comprises:

determining whether the time count number is a countdown number based on values of the time count numbers at the present time and a reference time in the time count area and an order of the present time and the reference time; and using the time count number at the present time as the time difference between the advertisement broadcast end time and the present time where the time count number is a countdown number.

12. The non-transitory computer storage medium of claim 9, wherein identifying the time count number in the time count area displayed along with the presently displayed advertisement frame in the video comprises:

identifying the time count number in the time count area displayed along with the presently displayed advertisement frame in the video by using a text recognition algorithm.

* * * * *